April 28, 1942.   L. A. POWELL   2,281,455
ROTARY OPERATIVE FASTENER
Filed April 16, 1940
FIG. 1.
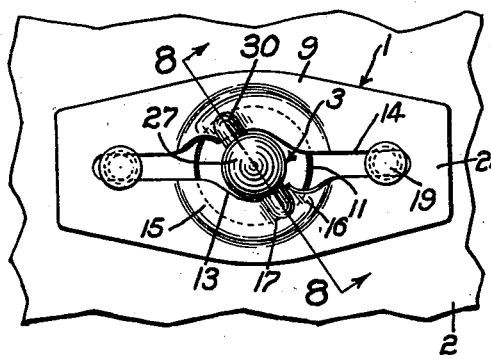
FIG. 2.
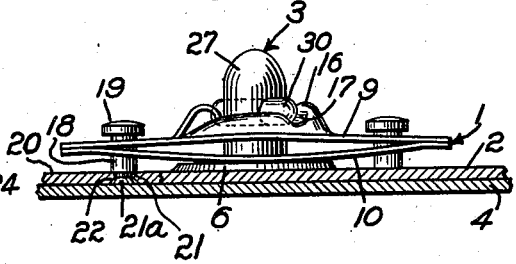
FIG. 4.
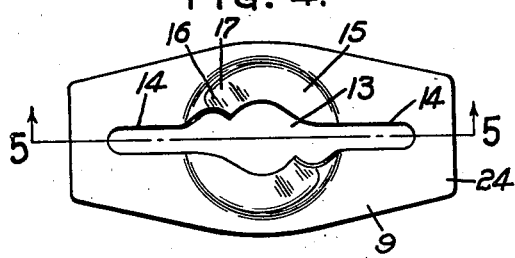
FIG. 3.
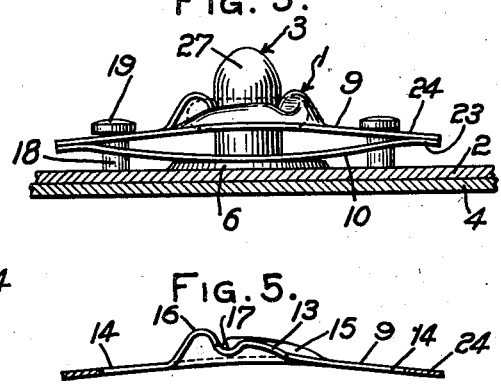
FIG. 5.
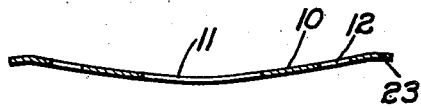
FIG. 6.
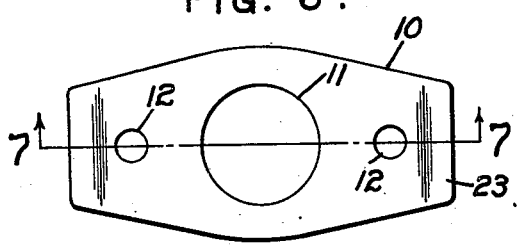
FIG. 7.
FIG. 9.
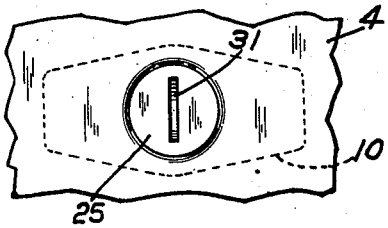
FIG. 8.
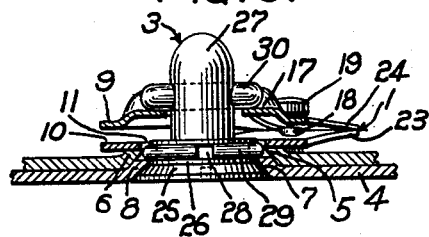
INVENTOR:
LEONARD A. POWELL,
BY John Todd ATT'Y.

Patented Apr. 28, 1942

2,281,455

UNITED STATES PATENT OFFICE 2,281,455

ROTARY OPERATIVE FASTENER

Leonard A. Powell, Hyde Park, Mass., assignor to United-Carr Fastener Corporation, Cambridge, Mass., a corporation of Massachusetts Application April 16, 1940, Serial No. 329,903

9 Claims. (Cl. 24—221)

This invention relates to improvements in rotary operative type fasteners and installations thereof.

In the drawing, which illustrates a preferred embodiment of my invention:

Fig. 1 is a rear elevation of an installation embodying my invention;

Fig. 2 is a side elevation of the installation shown in Fig. 1 and showing the position of the parts in fastened relation;

Fig. 3 is a view similar to that of Fig. 2 and showing the position of the parts in unfastened relation;

Fig. 4 is a plan view of one plate of my improved spring fastener;

Fig. 5 is a sectional view taken along the line 5—5 of Fig. 4;

Fig. 6 is a plan view of another plate of my improved spring fastener;

Fig. 7 is a sectional view taken along the line 7—7 of Fig. 6;

Fig. 8 is a section taken along the line 8—8 of Fig. 1; and

Fig. 9 is a rear elevation slightly reduced of the installation shown in Fig. 1.

Referring to the drawing, I have shown a rotary type of fastener which is particularly, though not exclusively, adaptable to use in connection with aircraft. It is understood, however, that I do not wish to limit application of my improved fastening to any particular installation as it may be used for any purpose where it is desired to secure together two rigid plate-like members. The fastener illustrated comprises two units, one of which I shall term a spring unit and the other of which I shall term a rotary unit. The spring unit 1 is secured on one side of a rigid supporting panel 2 and the rotary unit 3 is carried by a supporting panel 4. The panel 2, in my preferred installation, has an aperture 5 (Fig. 8) surrounded by a frustro-conical wall 6 and the panel 4 has an opening 7 (Fig. 8) through which the rotary member projects. The opening 7 is preferably surrounded by an embossment 8 in order that the panel 4 may present a substantially flush outer surface when the rotary unit is assembled with the same.

The spring unit 1 is preferably made up of two pieces and comprises upper and lower spring plates 9 and 10. The plates are disposed in superposed relation and loosely assembled for relative flexure one to the other for a purpose to be described. The lower plate 10, as most clearly shown in Figs. 6 and 7, is of elongated form and bowed in a longitudinal direction. The upper plate 9 is similar in size and shape and also bowed, but preferably in an arc containing a lesser number of degrees than the plate 10. The plate 10 has a central opening 11 for receiving the rotary unit 3 and relatively smaller openings 12 on opposite sides of the central opening 11 and adjacent opposed longitudinal ends of the plate adapted to receive attaching portions by which the spring unit is assembled with the supporting panel 2, as will be hereinafter more fully described.

The upper plate 9 has an aperture 13 adapted to align with the aperture 11 of the lower plate when the parts of the spring unit are in final assembly and a pair of slots 14—14 extend from opposite sides of the aperture 13, as most clearly shown in Fig. 4, a predetermined distance toward longitudinal ends of the plate 9 to align at points along their length with the openings 12 of the plate 10. The plate 9 is embossed on opposite sides of the aperture 13 and these embossments are preferably of arc shape. Each embossment has a gradually rising cam surface 15 extending from a low point adjacent one of the slots 14 and continuing to a high point 16 adjacent the other slot. Intermediate the ends of the embossed portion there is provided a locking recess 17 adapted to receive a projection of the rotary unit 3, as will be more fully described in connection with the operation of the fastener.

In assembling the spring unit 1 with the supporting panel 2, the plates 9 and 10 are first disposed in superposed position with their bows in opposite relation one to another in the manner of an elliptical spring. When the plates are in this position, the openings 12 of the plate 10 will be in alignment with respective slots 14—14 of the plate 9 and the aperture 11 will be in alignment with the aperture 13. The spring unit 1 is secured to the panel 2, in my preferred form, through means of rivets providing a shank 18 extending through the aligned slots 14 and openings 12 of the plates and having a head 19 at one end spaced from the rear surface 20 of the panel 2 a predetermined distance. The opposite end of the shank has a shoulder 21 abutting the surface 20 and a head 21ª received within a countersunk hole 22 in the panel 2, as shown in Fig. 2. It will be noticed that when the spring unit is finally assembled with the panel 2, a portion of the plate 10 rests upon the embossment 6 of the panel 2 (Figs. 3 and 8) and the ends 23—23 of the plate 10 abut the ends 24—24 of the plate 9. The plate 10 is bowed sufficiently to enable the ends 23 of the plate 10 to support the plate 9 and maintain the same against the under side of the heads 19 of the attaching rivets (Fig. 3) and in proper position to effect engagement with the rotary member. At the same time the plates 9 and 10 are free to flex one relative to the other.

The rotary unit 3 comprises a head portion 25 which is larger in diameter than the opening 7 of the panel 4 and a shank having a base portion 26 (Fig. 8) which is slightly smaller in diameter than the aperture 7 and a reduced nose 27. The base portion 26 has an annular groove 28 (Fig. 8) adapted to receive a split ring 29 whereby the rotary unit is held in assembly with the panel 4. A pin 30 is driven or otherwise secured in an aperture of the nose 27 so that opposite ends of the pin extend beyond opposite surfaces of the shank in a direction transverse to the normal axis of the shank. The head 25 has a slot 31 to receive a suitable implement by which the device may be rotated.

In fastening the panel 4 to the panel 2, the plates are brought into superposed relation so that the aperture 7 is in approximate alignment with the aperture 5. The openings 11 and 13 of the plates of the spring unit 1 are in alignment with the opening 5 to receive the nose 27 of the rotary member. As the nose 27 passes through the aperture 13 of the plate 9, the pin member 30 will pass through the slots 14, if aligned therewith, or may be turned into proper alignment to pass therethrough. After the pin has passed through the slots 14—14, the rotary member is turned in a clockwise direction, viewing Fig. 9, causing the pin 30 to engage over the cam surfaces 15, at the same time compressing the spring unit by causing the ends 24 of the plate 9 to press against the ends 23 of the plate 10 thereby flattening the plates. When the ends of the pin arrive at the recesses 17, the spring unit, because of the tendency of the plates 9 and 10 to return to normal shape, presses the plate 9 against the pin so that the pin enters the recesses 17 and is held against accidental rotation by vibration once the parts are fastened together. The high portions 16 prevent the rotary unit being turned beyond the point where the pin enters the locking recesses. The fastener may be unlocked by reversing the action hereinabove described.

My improved fastening is simple in construction and relatively inexpensive to manufacture and assemble. The spring unit is superior to one-piece devices by being more flexible as its resiliency is effected by two spring parts rather than one. The unit is also stronger as the forces necessary for flexing the fastening plate of the same are distributed over the area of both parts thereof.

Although I have illustrated and described a preferred embodiment of my invention, I do not wish to be limited thereby because the scope of my invention is best defined by the following claims.

I claim:

1. A spring unit for fastener cooperation with a rotating member of the type having a shank and at least one projection extending from said shank, said unit including a plate having an opening to receive a portion of the shank and the projection of said rotating member, said plate having fastener means engaging with said projection when said shank is rotated, said fastener means being adapted to cooperate with said projection to bring about fastener engagement between the parts, and a separate spring member disposed beneath said plate and flexible relative to said plate during said rotative movement of said shank.

2. A spring unit for fastener cooperation with a rotating member of the type having a shank and at least one projection extending from said shank, said unit including a pair of superposed plates, said plates having aligned openings to receive a portion of the shank and the projection of said rotating member, one of said plates having fastener means engaging with said projection when said shank is rotated, said fastener means being adapted to cooperate with said projection to bring about fastener engagement between the parts, and one of said plates being flexible relative to the other during said rotative movement of said shank.

3. A spring unit for fastener cooperation with a rotating member of the type having a shank and at least one projection extending from said shank, said unit comprising a pair of superposed plates adapted to be loosely assembled together, said plates having aligned openings to receive a portion of the shank and the projection of said rotating member, each of said plates being flexible and one of said plates having fastener means engaging with said projection when said shank is rotated, said fastener means being adapted to cooperate with said projection to bring about fastener engagement between the parts, and said plates flexing one relative to the other during said rotative movement of said shank.

4. A spring unit for fastener cooperation with a rotating member of the type having a shank and at least one projection extending from said shank, said unit comprising a pair of flexible bowed plates, said plates being in superposed relation with the bow of one plate describing an arc opposite to the arc of the other plate, said plates having aligned openings to receive a portion of the shank and the projection of said rotating member, one of said plates having fastener means engaging with said projection when said shank is rotated, said fastener means being adapted to cooperate with said projection to bring about fastener engagement between the parts, and said plates flexing one relative to the other during said rotative movement of said shank.

5. A spring unit for fastener cooperation with a rotating member of the type having a shank and at least one projection extending from said shank, said unit including a pair of superposed plates, said plates having aligned openings to receive a portion of the shank and the projection of the rotating member, one of said plates having an integral embossed portion in said spring on an arc concentric with the center of said opening providing a gradually rising cam surface, a depression, and a stop for cooperation with said projection during rotation of said rotating member in one direction, and one of said plates being flexible relative to the other during said rotative movement.

6. A spring unit for fastener cooperation with a rotating member of the type having a shank and at least one projection extending from said shank, said unit comprising a pair of elongated plates, each of which is bowed longitudinally, said plates being adapted to be loosely assembled together in superposed relation with the bow of one plate describing an arc opposite to the arc of the other plate, said plates having aligned openings to receive a portion of the shank and the projection of said rotating member, one of said plates having an integral embossed portion in said spring on an arc concentric with the center of said opening providing a gradually rising cam surface, a depression, and a stop for cooperation with said projection during rotation of said rotating member in one direction, and said plates being flexible one relative to the other during said rotative movement.

7. A fastener installation including a supporting panel having attaching portions extending therefrom, each of said attaching portions having a shank extending from said panel and a head at the end of said shank away from said panel and spaced from said panel, a fastener unit assembled with said panel comprising a pair of superposed plates having aligned openings receiving said shanks of said attaching portions whereby said plates are maintained in assembly between said heads and said panel, a rotating member having a shank and at least one projection extending from said shank, said plates having aligned openings receiving a portion of said shank of said rotating member, one of said plates having fastener means engaging with said projection when said shank is rotated, said fastener means cooperating with said projection to effect fastener engagement between the parts, and at least one of said plates being flexible relative to the other of said plates during said rotative movement of said shank.

8. A fastener installation including a supporting panel, a fastener unit including a pair of superposed plates, means maintaining said plates in loose assembly one with another and in predetermined attached relation to said panel, a rotating member having a shank and at least one projection extending from said shank, said plates having aligned openings receiving a portion of said shank of said rotating member, one of said plates having fastener means engaging with said projection when said shank is rotated, said fastener means cooperating with said projection to effect fastener engagement between the parts, and at least one of said plates being flexible relative to the other of said plates during said rotative movement of said shank.

9. A fastener installation including a supporting panel having attaching portions extending therefrom, each of said attaching portions having a shank extending from said panel and a head at the end of said shank away from said panel and spaced from said panel, a fastener unit assembled with said panel comprising a pair of flexible superposed plates having aligned openings receiving said shanks of said attaching portions whereby said plates are maintained in assembly between said heads and said panel, each of said plates being bowed and assembled with their bows in opposite relation, one of said plates being maintained against said head under the tension of said lower plate, a rotary member having a shank and at least one projection extending from said shank, said plates having aligned openings receiving a portion of said shank of said rotating member, one of said plates having fastener means engaging with said projection when said shank is rotated, said fastener means cooperating with said projection to effect fastened engagement between the parts, and said plates being flexible one relative to the other during said rotative movement.

LEONARD A. POWELL.